Patented Oct. 14, 1941

2,259,353

UNITED STATES PATENT OFFICE 2,259,353

ACCELERATOR

Winfield Scott, Akron, Ohio, assignor to Wingfoot Corporation, Wilmington, Del., a corporation of Delaware No Drawing. Application October 17, 1936, Serial No. 106,199

11 Claims. (Cl. 260—298)

This invention relates to new compositions of matter which have been found to be valuable accelerators of rubber vulcanization. It includes the process of vulcanizing rubber in their presence and rubber so treated. The new compositions are selenazyl 2-selenide compounds and contain the grouping

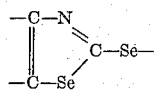

The mercaptothiazoles and derivatives thereof are known to be accelerators of vulcanization. Mercaptobenzothiazole and dibenzothiazyl disulphide are two members of the class which have been used extensively. Heretofore it has been considered that only those derivatives of the benzothiazoles having a mercaptan grouping of sulphur attached to the 2-carbon atom of the thiazole ring are active as accelerators of rubber vulcanization. Illustrative of such compounds are 2-mercaptobenzothiazole itself and various derivatives made from 2-mercaptobenzothiazole in which the hydrogen of the mercaptan group has been replaced by another radical or group. Those compounds such as 2-benzothiazole and 2-amino benzothiazole are not accelerators of vulcanization, 2-amino benzothiazole does have feeble basic properties and on this account it has some activating effect on accelerators of the mercaptan and dithio acid types, but it itself has practically no value as an accelerator.

This invention involves the discoveries of the selenazyl 2-selenide compounds and of their use in the vulcanization of rubber. It has been found that they are excellent accelerators and, surprisingly, are more active accelerators than the corresponding 2-mercaptothiazoles.

Illustrative of the compounds of the invention is the formula

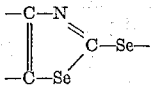

Attached to the open bonds of the adjacent carbon atoms of the selenazole ring may be hydrogen or aliphatic or aromatic radicals. Preferably, however, these two adjacent carbon atoms form part of an arylene radical, such as phenylene, nitro phenylene and naphthylene radicals. Attached to the open bond of the selenyl selenium atom may be hydrogen or any organic or inorganic radical, such as salt or ester-forming radicals. These compounds are such that by hydrolysis, double decomposition, rearrangement or by the application of heat, they are capable of forming the free selenyl (—SeH) compound or its diselenide.

Illustrative of such compounds are the 2-selenyl selenazoles, such as 2-selenyl benzoselenazole; the diselenazyl selenides, such as di(benzoselenazyl) diselenide and di(benzoselenazyl) mono selenide; the metal salts of the 2-selenyl selenazoles, such as the zinc, lead, cadmium, mercury, calcium, sodium, potassium and barium salts of 2-selenyl benzoselenazole; the reaction products of alkali metal salts of the 2-selenyl selenazoles with chlorinated organic compounds, such as the reaction products of sodium benzoselenazyl 2-selenide with the ortho nitro chlor benzenes, with the aromatic acyl halides, with the furoyl and tetrahydro furoyl halides, with the chlorinated ketones, with the mono and dichlor acetates, with the mono and dichlor acetamides, with chlor benzothiazole, etc. Other illustrative compositions of the invention are the reaction products of 2-selenyl benzoselenazole with formaldehyde, with amines, with the guanidines such as diphenylguanidine and diortho tolyl guanidine, and with aldehyde amines such as ethylideneaniline, crotonylidene-aniline and hexamethylenetetramine, and other reaction products of the 2-selenyl selenazoles with organic materials in which the compositions of the reaction products are unknown. These examples indicate only a few of the compounds of the invention as will be apparent from the following description.

The preparation of the compositions of the invention is illustrated in the following examples. All those with, of course, the exception of the 2-selenyl selenazoles may be prepared by reacting the 2-selenyl selenazole or soluble salt thereof with the desired ingredient or ingredients, the processes being similar to those involved in preparing the corresponding derivatives of the 2-mercaptothiazoles.

Illustrative but not limitative of the invention are the following examples:

Example 1

2-selenyl benzoselenazole may be prepared by the action of sodium selenide or hydroselenide on 2-chlor benzoselenazole. Thus, 0.4 mol of sodium hydroxide is dissolved in 500 cc. of water (more or less water may be used as the strength of the solution is not critical) and the solution is saturated with hydrogen selenide to form a solution of sodium hydroselenide. When no more gas is absorbed, the charging of the hydrogen selenide is discontinued and 0.4 mol of caustic soda is added. This gives a solution containing 0.4 mol of normal sodium selenide (Na₂Se). To this solution of sodium selenide are added 0.4 mol of 2-chlor benzoselenazole and with rapid stirring the reaction mixture is then heated to gentle reflux. If desired, the sodium selenide solution may be first heated and the 2-chlor benzoselenazole added slowly with efficient stirring. The mixture is maintained at gentle ebullition for a period of from 30 to 45 minutes or until droplets of the 2-chlor benzoselenazole disappear in the reflux. The solution then contains the 2-selenyl benzoselenazole in the form of its sodium salt, the equation for the reaction being as follows:

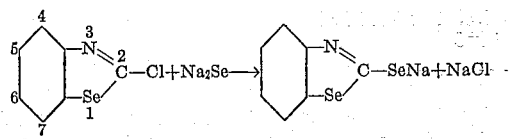

The 2-selenyl benzoselenazole is then precipitated from the solution of its sodium salt with an acidifying agent such as hydrochloric or sulphuric acid. The product, 2-selenyl benzoselenazole, after crystallization from benzene, is a light yellow crystalline powder which melts with decomposition at 152–153° C.

6-nitro 2-selenyl benzoselenazole, 2-selenyl selenazole and 2-selenyl alpha naphthoselenazole and other 2-selenyl selenazoles may be prepared similarly by employing the corresponding 2-chlor selenazole instead of 2-chlor benzoselenazole.

Example 2

Di(benzoselenazyl) diselenide is readily prepared by subjecting 2-selenyl benzoselenazole to the action of oxidizing agents such as iodine, hydrogen peroxide, ammonium persulphate, etc. Thus, if an alcohol solution of iodine is added to a solution of 2-selenyl benzoselenazole in alcohol, the diselenide, being quite insoluble in the solvent, precipitates. It can also be conveniently prepared by treating an aqueous solution of sodium benzoselenazyl 2-selenide with an aqueous solution containing hydrogen peroxide and sulphuric acid. Di(benzoselenazyl) diselenide is a yellow crystalline powder melting at 228–229° C. and has the formula

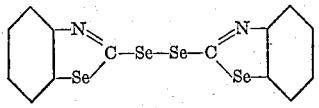

Other diselenazyl diselenides may be prepared similarly by oxidizing the desired 2-selenyl selenazole, examples being di(6-nitro benzoselenazyl) diselenide, diselenazyl diselenide, di(4-methyl benzoselenazyl) diselenide, di(7-phenyl benzoselenazyl) diselenide, di(beta naphthoselenazyl) diselenide, and di(5-ethoxy benzoselenazyl) diselenide.

Example 3

Bivalent metal and other metal salts of the 2-selenyl selenazoles other than the alkali metal salts are conveniently prepared by adding a solution of a soluble salt of the desired metal to an aqueous solution of an alkali metal salt of the 2-selenyl selenazole. Thus, the zinc salt of 2-selenyl benzoselenazole is prepared by dissolving 15 grams of 2-selenyl benzoselenazole in 200 cc. of an aqueous solution of caustic soda containing 2.3 grams of sodium hydroxide. To this are added with stirring 50 cc. of an aqueous solution containing 4.0 grams of zinc chloride. The zinc benzoselenazyl 2-selenide,

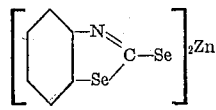

precipitates at once and after filtering, washing and drying is obtained as a light yellow powder.

Other bivalent metal salts of the 2-selenyl selenazoles may be prepared similarly. Illustrative are lead benzoselenazyl 2-selenide, mercuric benzoselenazyl 2-selenide, cadmium benzoselenazyl 2-selenide, calcium benzoselenazyl 2-selenide, zinc 4-methoxy benzoselenazyl 2-selenide, lead 7-ethyl benzoselenazyl 2-selenide, barium 5-ethoxy benzoselenazyl 2-selenide, and zinc beta naphthoselenazyl 2-selenide.

Example 4

Upon the addition of an amine to a 2-selenyl selenazole an addition product of the amine and the selenazole forms. It appears that the nitrogen of the amine becomes pentavalent, adding on to the selenium atom of the selenyl group and taking on the hydrogen atom originally attached to this selenium atom. Illustrative is the piperidine salt of 2-selenyl benzoselenazole which is prepared by suspending 2-selenyl benzoselenazole in ether and adding thereto with stirring an equivalent amount of piperidine. The resulting salt, which is insoluble in ether, forms immediately and is filtered off and washed with a small amount of fresh ether after which the ether is evaporated. The product, piperidinium benzoselenazole 2-selenide, melting at 143–144° C., is obtained in the form of a light yellow powder. The equation believed to represent the reaction is as follows:

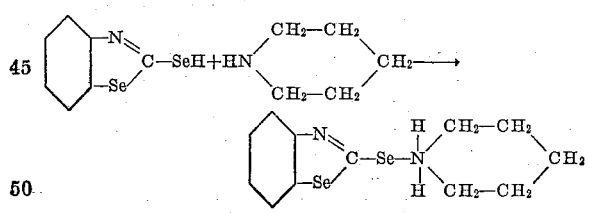

Example 5

The cyclohexylamine salt of 2-selenyl benzoselenazole was prepared by adding 6.3 grams of cyclohexylamine to a solution of 15 grams of 2-selenyl benzoselenazole in 75 cc. of acetone. 20 cc. of petroleum ether were then added and the mixture allowed to stand for 30 minutes. The resulting crystals of cyclohexyl ammonium benzoselenazyl 2-selenide were filtered off and washed with a fresh portion of petroleum ether, a 90% yield being obtained. The melting point of the compound was 151–152° C.

Other amine salts of the 2-selenyl selenazoles may be prepared similarly merely by reacting the desired 2-selenyl selenazole with the desired amine. Illustrative are the ethylene diamine, diethyl amine, butyl amine, dibutyl amine, tetrahydro alpha furfuryl amine, diamyl amine, N-ethyl cyclohexyl amine, p-phenylene diamine, dibutyl ethylene diamine, di iso propyl amine, and hexahydro phenetidine salts of 2-selenyl benzoselenazole, 2-selenyl 6-ethoxy benzoselenazole, and of 2-selenyl 4-phenyl benzoselenazole.

The guanidine salts may also be prepared similarly, examples being the diphenylguanidine, mono phenyl guanidine di (ortho tolyl) guanidine, dixylyl guanidine and triphenyl guanidine salts of 2-selenyl benzoselenazole, of 2-selenyl 6-nitro benzoselenazole, and of 2-selenyl beta naphthoselenazole.

The ammonia reaction products of the 2-selenyl selenazoles are also included in the invention, of which ammonium benzoselenazyl 2-selenide and ammonium 4-phenyl benzoselenazyl 2-selenide are illustrative. These ammonia, amine and guanidine addition products of the 2-selenyl selenazoles may be further reacted with aldehydes to form compositions of unknown structure which are excellent accelerators. Illustrative are the crotonaldehyde reaction product of the reaction product of 2-selenyl benzoselenazole and hexamethylenetetramine, the acetaldehyde reaction product of butyl ammonium benzoselenazyl 2-selenide, and the formaldehyde reaction product of the ethylene diamine addition product of 2-selenyl benzoselenazole.

Example 6

An excellent accelerating composition whose structure has as yet not been identified is prepared by reacting two molar proportions of 2-selenyl benzoselenazole, two molar proportions of formaldehyde and one molar proportion of urea. Thus, 15 grams of 2-selenyl benzoselenazole, 4.7 grams of an aqueous solution containing 36% formaldehyde and 1.7 grams of urea were placed in 75 cc. of water. To this mixture 10 cc. of concentrated hydrochloric acid were added. The mixture was heated on a steam bath for a few minutes after which the reaction mixture was filtered and washed with water. The product obtained was in the form of a light colored powder melting at 194–197° C. The yield was 17.7 grams or 100% of theory.

Similar reaction products may be prepared by substituting for the 2-selenyl benzoselenazole other 2-selenyl selenazoles, such as 2-selenyl 6-methyl benzoselenazole, 2-selenyl selenazole, 2-selenyl 6-hydroxy benzoselenazole, etc. Thiourea may be used in place of urea.

Example 7

To an aqueous or alcoholic solution of sodium benzoselenazyl 2-selenide is added a molecular equivalent of 2-4-dinitro chlor benzene and the mixture heated under a reflux condenser until the odor of dinitro chlor benzene disappears. The mixture is then cooled and the resulting 2-4-dinitro phenyl benzoselenazyl 2-selenide,

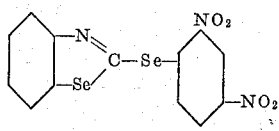

which precipitates out, is removed by filtration, washed free of sodium chloride and dried. After recrystallization from a mixture of benzene and ethyl acetate, it is obtained in the form of canary yellow crystals melting at 172–174° C.

Other nitro phenyl benzoselenazyl 2-selenides may be prepared by replacing the dinitro chlor benzene with the desired nitro chlor benzene in which a nitro group should be ortho to the chlorine. Illustrative are 2-6-dinitro 4-chlor phenyl benzoselenazyl 2-selenide, 2-4-6-trinitro phenyl benzoselenazyl 2-selenide and 2-nitrophenyl benzoselenazyl 2-selenide.

Example 8

Benzothiazyl benzoselenazyl mono selenide was prepared by adding 15 grams of 2-selenyl benzoselenazole and 9.7 grams of 2-chlor benzothiazole to benzene. The mixture was refluxed on a steam bath for about an hour and was then permitted to cool. The solid material that had separated out was filtered and washed. After crystallizing several times from alcohol it melted at 114° C. The equation representing the reaction is believed to be as follows:

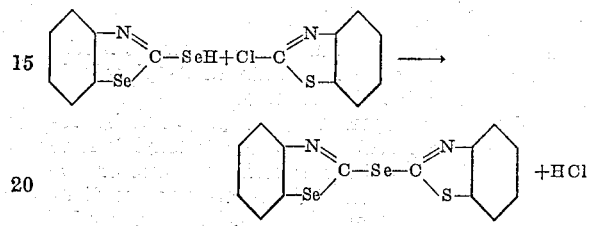

Other selenazyl thiazyl mono selenides may be prepared similarly by employing other 2-selenyl selenazoles and other 2-chlor thiazoles. Illustrative is 6-nitro benzoselenazyl 6-nitro benzothiazyl 2-selenide. Diselenazyl mono selenides, such as dibenzoselenazyl 2-selenide, may be prepared likewise by employing a 2-chlor selenazole instead of a 2-chlor thiazole.

Example 9

A solution of 15 grams of 2-selenyl benzoselenazole in 50 cc. of 50% alcohol was treated with 2.3 grams of sodium hydroxide. To this solution were added slowly and with stirring 6.2 grams of ethyl chlorocarbonate. A pale yellow oil was formed, which crystallized on cooling. The product, 2-(carbethoxyselenyl) benzoselenazole, melted at 82–84° C. and was obtained in an almost quantitative yield. The equation believed to represent the reaction is as follows:

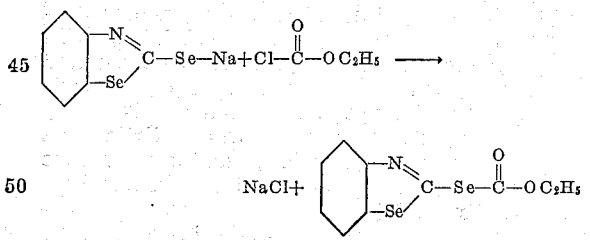

Example 10

Further illustrative of the invention is the class of selenazyl 2-selenide compounds prepared by reacting at room temperatures, or slightly higher, a 2-selenyl selenazole, formaldehyde and a secondary amine or a primary aromatic amine. In the reaction water is split out, the methylene group of the formaldehyde apparently linking the selenazyl 2-selenide group and the amino radical to form compounds which may be called amino methylene selenazyl 2-selenides or 2-(aminomethylselenyl) selenazoles. In one embodiment of this class 15 grams of 2-selenyl benzoselenazole and 4.9 cc. of a 36% aqueous formaldehyde solution were added to 50 cc. of ethyl alcohol. To this mixture were added with stirring 4.9 grams of piperidine. After a few minutes a yellow solid crystallized out. Upon drying, the product melted without further purification at 125–126° C. When recrystallized from benzene and petroleum ether this product melted at 126–127° C. It is believed to possess one of the two formulae:

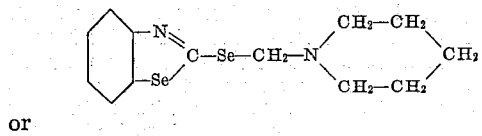

or

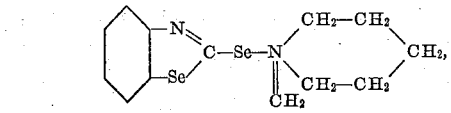

and may be called pentamethylene amino methylene benzoselenazyl 2-selenide, or 2-(piperidylmethylselenyl) benzoselenazole.

Similar accelerators may be prepared by replacing the piperidine or the 2-selenyl benzoselenazole with another secondary amine or another 2-selenyl selenazole. Exemplary are di-n-butyl amino-, dibenzylamino-, N-ethyl cyclohexyl amino-, oxytetramethylene amino-, and phenyl beta naphthylamino methylene benzoselenazyl 2-selenides.

*Example 11*

Phenyl amino methylene benzoselenazyl 2-selenide, believed to have the formula

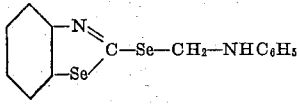

may be prepared by suspending 15 grams of 2-selenyl benzoselenazole in 50 cc. of ethyl alcohol and adding thereto 4.9 grams of an aqueous 36% formaldehyde solution. To this are added with stirring an equivalent amount of aniline. The mixture is then warmed for 10–15 minutes, after which the resulting precipitate is filtered and dried. It is a yellow crystalline solid.

Corresponding products may be prepared by replacing the aniline with other primary aromatic amines, such as ortho toluidine, para toluidine, the ortho and para phenetidines and anisidines, and the alpha and beta naphthylamines. Similarly, the nitroso derivatives may be made by adding gaseous ethyl nitrite to a benzene solution of these aryl amino methylene benzoselenazyl 2-selenides cooled to a temperature of about 10° C.

Many other compounds of the invention may be prepared similarly by replacing, for example, the 2-4-dinitro chlor benzene of Example 7 with the desired halogenated compound. Illustrative are the reaction products of sodium or potassium benzoselenazyl 2-selenide with furoyl chloride, with phthaloyl chloride and with benzoyl chloride. Others are the reaction product of sodium benzoselenazyl 2-selenide and mono chlor acetone, and the reaction product of one mol of asymmetrical dichlor acetone and two mols of sodium benzoselenazyl 2-selenide. In like manner a benzoselenazyl 2-selenide reaction product of the invention is prepared by reacting in aqueous solution two mols of sodium benzoselenazyl 2-selenide with one mol of benzal chloride. Other accelerators of the invention may be prepared by reacting ortho nitrophenyl sulphur halides with sodium benzoselenazyl 2-selenide in aqueous solution. Illustrative are the reaction product of 2-benzoyl 4-nitro phenyl sulphur bromide and sodium benzoselenazyl 2-selenide, and the reaction product of 2-nitro phenyl sulphur chloride and sodium benzoselenazyl 2-selenide.

Further illustrative of the invention are the accelerators prepared by reacting in alcoholic solution sodium selenazyl 2-selenides and aryl seleno halides, such as the reaction product of o-nitro phenyl seleno chloride and sodium enzoselenazyl 2-selenide, and the reaction product of phenyl seleno chloride and sodium benzoselenazyl 2-selenide. Still other accelerators of the invention are the reaction products prepared by reacting in alcoholic solution 2-chlor quinoline with, respectively, sodium benzoselenazyl 2-selenide and sodium 5-nitro benzoselenazyl 2-selenide.

Another composition of the invention is that accelerator called the hexamethylenetetramine benzyl ester of 2-selenyl benzoselenazole, which is prepared by reacting in aqueous solution equimolar proportions of sodium benzoselenazyl 2-selenide and the benzyl chloride addition product of hexamethylenetetramine. Dibenzoselenazyl diseleno carbonate is prepared similarly by reacting in aqueous solution or in benzene solution two molar proportions of sodium benzoselenazyl 2-selenide and one molar proportion of carbonyl chloride, the reaction preferably being carried out at a temperature below 10° C. The thio phosgene derivatives of the 2-selenyl benzoselenazoles may be prepared similarly.

Quaternary ammonium halides react with alkali metal benzoselenazyl 2-selenides to form accelerators of the invention. Thus, upon the addition of sodium benzoselenazyl 2-selenide to a hot benzene solution of hexa decyl pyridinium chloride and refluxing the reaction mixture for several hours, the reaction product of hexa decyl pyridinium chloride and sodium benzoselenazyl 2-selenide is obtained. By replacing this quaternary ammonium halide with hexa decyl trimethyl ammonium bromide, with benzyl trimethyl ammonium chloride, with benzyl pyridine ammonium chloride, with beta hydroxy ethyl pyridine chloride, the corresponding benzoselenazyl 2-selenides are obtained.

Other compounds of the invention are the reaction product of N-chloro piperidine with sodium benzoselenazyl 2-selenide, the reaction product of N-chloro morpholine with sodium benzoselenazyl 2-selenide, and the corresponding reaction products in which dimethyl chlor amine and dibutyl chlor amine are substituted for the N-chloro piperidine and N-chloro morpholine.

Other reaction products of chlorinated compounds with sodium benzoselenazyl 2-selenides are the reaction products of mono and dichlor acetophenone with sodium benzoselenazyl 2-selenide, the reaction product of diphenyl carbamine chloride with sodium benzoselenazyl 2-selenide, and the reaction products of imino methylene dichlorides and dichlor di imides with these selenides. Another accelerator of the invention is the product prepared by reacting acetyl chloride on benzoselenazyl 2-seleno methylene hydrin.

Still other illustrative examples of the invention are the reaction products of formaldehyde with the 2-selenyl selenazoles, such as benzoselenazyl 2-seleno methylene hydrin, or, as it may be called 2-(hydroxymethylselenyl) benzoselenazole. Addition products of amines and zinc selenazyl 2-selenides may be formed by adding the amine to the zinc selenazyl 2-selenide in petroleum ether. Exemplary are the piperidine-.

cyclohexylamine-, benzylamine-, diamylamine-, di-n-butylamine-, diisopropylamine-, hexahydro phenetidine-, hexahydro toluidine-, ethylene diamine-, tetrahydro alpha furfurylamine-, N-methyl cyclohexylamine-, amyl amine-, butyl amine-, heptyl amine and hexyl amine addition products of zinc benzoselenazyl 2-selenide.

Still other compositions of the invention are the reaction products of methylol guanidines with the 2-selenyl selenazoles, illustrative of which is the reaction product of 2-selenyl benzoselenazole with the reaction product of diphenylguanidine and formaldehyde. Other compositions are the reaction products of the 2-selenyl selenazoles with methylol amides. Thus, formaldehyde is reacted with acetamide or benzamide or other amide in molar proportions and the product then mixed with a mol of 2-selenyl benzoselenazole and the product heated until water is split out.

The products of the invention have been found to be excellent accelerators of the vulcanization of rubber, being quite active at relatively low temperatures. Illustrative of one formula in which the products of the invention have been found satisfactory is the following:

| | Parts by weight |
|---|---|
| Smoked sheet rubber | 100 |
| Zinc oxide | 5 |
| Sulphur | 3 |
| Accelerator | As indicated |

Results obtained by the use of this formula are as follows, the figures given being those for the optimum cure in the range tested as determined by hand tests. Also, tests are included showing the comparative action of the accelerators with three corresponding accelerators of the 2-mercaptothiazole type.

| Accelerator | Amt. pts. by wt. | Cure in mins., °F. | Ult. tens. | Max. elg. | Kgs./cm.² at— | |
|---|---|---|---|---|---|---|
| | | | | | 500% | 700% |
| 2-selenyl benzoselenazole | 0.50 | 20/260 | 143 | 790 | 23 | 83 |
| 2-mercaptobenzothiazole | 0.50 | 40/260 | 130 | 840 | 17 | 57 |
| Di(benzoselenazyl)diselenide | 0.50 | 30/275 | 136 | 760 | 26 | 99 |
| Dibenzothiazyl disulphide | 0.50 | 40/275 | 110 | 800 | 19 | 60 |
| Zinc benzoselenazyl 2-selenide | 0.65 | 30/260 | 160 | 790 | 24 | 92 |
| Zinc benzothiazyl 2-mercaptide | 0.65 | 60/260 | 125 | 840 | 17 | 53 |
| Pentamethylene amino methylene benzoselenazyl 2-selenide | 0.20 | 40/260 | 142 | 790 | 23 | 84 |

It will be observed that the 2-selenyl selenazoles and their derivatives are considerably more powerful accelerators than mercaptobenzothiazole and its corresponding derivatives. They cause the vulcanization of rubber in much shorter times and also provide a stiffer, snappier cure as is shown by the much higher tensile figures at 500% and 700% than those for the corresponding thiazyl 2-sulphide compounds. With some of the selenazyl 2-selenide compounds, such as dibenzo selenazyl mono selenide and benzothiazyl benzoselenazyl selenide, it will be found that their use in conjunction with basic nitrogen-containing activating accelerators is very satisfactory. Many of the selenazyl 2-selenide compounds, however, are sufficiently active in and of themselves that activation by a basic compound is neither necessary nor desirable.

It will be understood that, while 2-selenyl benzoselenazole and its derivatives have been used principally in describing the invention, the invention is not limited thereto but includes the class of 2-selenyl selenazoles and derivatives thereof broadly. Illustrative of other 2-selenyl selenazoles are 2-selenyl selenazole, 5-nitro 6-chlor 2-selenyl selenazole, 4-phenyl 2-selenyl selenazole, 4-5-di-p-anisyl 2-selenyl selenazole, 4-5-diphenyl 2-selenyl selenazole, 2-selenyl 5-nitro benzo selenazole, 5-, 6- or 7-methyl 2-selenyl benzoselenazoles, 2-selenyl 4-6-dimethyl benzoselenazole, 5-, 6- or 7-methoxy 2-selenyl benzoselenazoles, 2-selenyl 5- or 6-chlor benzoselenazole, 5-, 6- or 7-hydroxy 2-selenyl benzoselenazoles, 2-selenyl 5- or 6-amino benzoselenazole, 2-selenyl AR-tetrahydro alpha naphthoselenazole, 2-selenyl alpha or beta naphthoselenazole, 2-selenyl 6-phenyl amino benzoselenazole, etc. Of these the 2-selenyl arylene selenazoles of the benzene and naphthalene series are preferred.

From the foregoing description it will be apparent that an invention of generic scope is provided, the class of selenazyl 2-selenide compounds having been discovered and having been found excellent accelerators of the vulcanization of rubber. It is to be understood that by the expressions "selenazyl 2-selenide compounds" and "benzoselenazyl 2-selenide compounds," it is intended to include compounds and products embodying a selenazyl or benzoselenazyl radical, as the case may be, with a selenium atom attached to the mu carbon atom of the selenazole ring. While various embodiments of the invention have been described in detail, it will be understood that the invention is not so limited but that numerous modifications may be made therein without departing from the spirit of the invention or from the scope of the appended claims, wherein it is intended to cover all features of patentable novelty residing in the invention.

What I claim is:
1. The benzoselenazyl 2-selenide compounds.
2. Di(benzoselenazyl) diselenide.
3. Zinc benzoselenazyl 2-selenide.
4. 2-selenyl benzoselenazole.
5. The selenazyl 2-selenide compounds.
6. The aryl selenazyl 2-selenide compounds.
7. The metal salts of the 2-selenyl aryl selenazoles.
8. The metal salts of 2-selenyl benzoselenazole.
9. The bivalent metal salts of 2-selenazyl benzoselenazole.
10. The 2-selenyl aryl selenazoles.
11. The di(aryl selenazyl) selenides.

WINFIELD SCOTT.